No. 709,280. Patented Sept. 16, 1902.
I. TENNANT.
PNEUMATIC TIRE.
(Application filed Aug. 11, 1902.)
(No Model.)
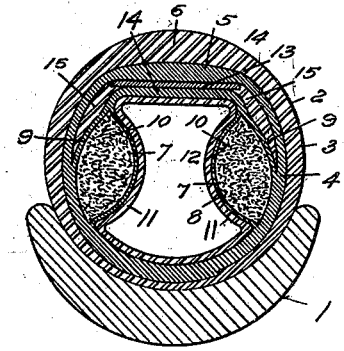
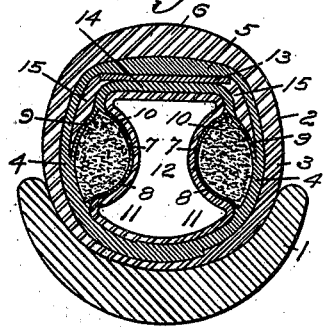
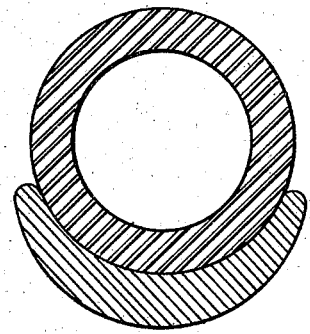
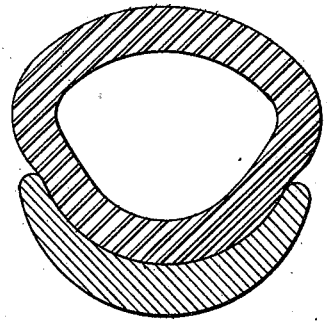
WITNESSES:
J. O. Dawley.
Will O'Laughlin.
INVENTOR.
Irvin Tennant
BY
ATTORNEY.
THE NORRIS PETERS CO., PHOTO-LITHO., WASHINGTON, D. C.

UNITED STATES PATENT OFFICE.

IRVIN TENNANT, OF SPRINGFIELD, OHIO.

PNEUMATIC TIRE.

SPECIFICATION forming part of Letters Patent No. 709,280, dated September 16, 1902.

Application filed August 11, 1902. Serial No. 119,175. (No model.)

*To all whom it may concern:*

Be it known that I, IRVIN TENNANT, a citizen of the United States, residing at Springfield, in the county of Clark and State of Ohio, have invented certain new and useful Improvements in Pneumatic Tires, of which the following is a specification, reference being had therein to the accompanying drawings.

This invention relates to pneumatic tires, and has for its object to provide a construction whereby the tire will be prevented from collapsing when in use by reason of being punctured or cut.

To this end my invention consists in certain novel features which I will now proceed to describe, and will then particularly point out in the claims.

In the accompanying drawings, Figure 1 is a sectional view of a tire embodying my invention in its preferred form. Fig. 2 is a similar view showing the tire under compression; and Figs. 3 and 4 are illustrative views showing the usual pneumatic tire free and under compression, respectively.

In the said drawings, 1 indicates a suitable rim, in which the tire is adapted to fit, and 2 indicates the tire as a whole, which is preferably circular in cross-section. The body of the tire is composed of an outer portion 3, of rubber, preferably thinnest at the rim and thickest at the tread and strengthened by a tubular body 4, of fabric, which is also preferably of increased thickness at the tread, as indicated at 5, and flattened at this point somewhat to cause an increased thickness of the rubber at the tread-surface, as indicated at 6. Within the tire, at the sides thereof, are located tubular spaces 7, defined by walls of fabric 8 and 9 and having a filling 10 of what is known as "sponge-rubber." These sponge-rubber bodies are elongated in cross-section, with their longitudinal axes converging outwardly, as shown, their outer ends being closer together than their inner ends. 11 indicates the inner tube or air-tube proper, which lines the air-space 12 and makes the same air-tight. The tread portion of the tire has embedded in it an annular flat metallic strip 13, which lies inward from the flattened portion 5 of the tubular fabric 4, and the ends of the fabric pieces 8 and 9 are carried across underneath or inward from this latter strip, as indicated at 14, so that the main or body portion of said metallic strip lies between the two layers of fabric 5 and 14. Bodies of rubber 15 are formed between the tubular fabric 4 and the outer fabric walls 9 of the spaces 8, and the edges of the metallic strip 13 extend over and rest upon these inclosed bodies of rubber, the inner band or fabric of rubber 14 terminating short of the edges of said metallic strip, as clearly shown in Figs. 1 and 2.

In practice in the manufacture of the tire it is built up and vulcanized, so as to form, in effect, a single body, the several layers of fabric and rubber being united to each other and inclosing the metallic strip during the process of vulcanization. I prefer, however, to insert the fillings of sponge-rubber in the annular spaces provided for them when said fillings are partially vulcanized or in what is known as a "half-cured" condition, since I have found that otherwise the sponge-rubber bodies will not become sufficiently vulcanized during the operation of vulcanizing the remainder of the tire. Moreover, I have found that in the process of manufacture these bodies of sponge-rubber swell or increase in size and give the walls of the spaces in which they are inclosed the desired conformation, so that the inner walls of said spaces form in practice inwardly-arched diaphragms. It will also be observed that the air-chamber 12 is contracted at its middle portion and wider at its ends, the outer end adjacent to the tread being of less width than the inner end, which is inclosed within the rim. The metallic strip 13 is of a width greater than the width of the outer portion or middle portion of the air-chamber. I have found by practical experience that a tire thus constructed effectually prevents puncture of the inner walls of the air-chamber and consequent flattening of the tire. The fabric and metallic strip lying between the tread and the air-chamber serve to prevent puncture or cutting by any articles which may attempt to pass through the tread portion of the tire inwardly toward the air-chamber, while the lateral chambers, with their sponge-rubber fillings and the layers of fabric protecting them and intervening between the outside of the tire and the inner tube 11 at the sides thereof, effectually prevent the passage of any object through to the said inner tube, so as to puncture the same. It will be observed that these lateral chambers extend so far down inward into the hollow of the rim that that portion of the tire lying inward from the lower ends of said chambers is effectually protected by the rim. The location of the bodies of rubber 15 between the edges of the metallic strip 13 and the rim serves to prevent said edges from coming into contact with the fabric portions of the tire when said metallic strip is forced inward by the pressure of the load, and thereby increases the durability of the tire. The elongated form of the lateral chambers gives these latter an extent sufficient to protect the exposed sides of the tire, while the inclination of their axes toward each other in an outward direction serves to prevent the tire from cutting on the edges of the rim. This will appear from a comparison of Figs. 1 and 2, the former of which shows the tire when inflated, but not under pressure of a load, while the latter shows the inflated tire when compressed under a load applied to its tread. It will be observed that there is no tendency of the outer ends of the sponge-rubber-filled chambers to move outwardly away from each other, the tendency being rather toward an inward motion of the sides of the tire, which therefore prevents the outer walls of the tire from lapping over the edges of the rim and being cut thereby. This latter tendency, which is present in pneumatic tires as ordinarily constructed, is illustrated in Figs. 3 and 4, the former figure showing the inflated tire unloaded and the latter figure showing the inflated tire under a load and clearly illustrating how the body of the tire is forced over the edge of the rim, so as to be cut thereby. This disadvantage is obviated by my improved construction.

I do not wish to be understood as limiting myself to the precise details of construction hereinbefore described, and shown in the accompanying drawings, as the same may be obviously modified without departing from the principle of my invention.

Having thus fully described my invention, what I claim as new, and desire to secure by Letters Patent, is—

1. A pneumatic tire comprising a tubular body having a thickened tread, lateral inwardly-arched diaphragms forming lateral protective chambers, and a central chamber for compressed air, fillings of sponge-rubber located in said lateral protective chambers, and a metallic protective strip located in the tread and of a width greater than the exposed portion of the central air-chamber, substantially as described.

2. A pneumatic tire comprising a tubular body having a thickened tread, lateral inwardly-arched diaphragms forming lateral protective chambers of elongated shape in cross-section, their longer axes converging outwardly, and a central chamber for compressed air, fillings of sponge-rubber located in said lateral protective chambers, and a metallic protective strip located in the tread and of a width greater than the exposed portion of the central air-chamber, substantially as described.

3. A pneumatic tire comprising a tubular body having a thickened tread, a tubular fabric inward of the same, and lateral bodies of sponge-rubber elongated in cross-section and with their longer axes inclined outwardly toward each other, fabric walls inclosing said sponge-rubber bodies and united with each other at the tread of the tire, a metallic protective strip located in the tread of the tire between the outer and inner layers of fabric and having a width greater than the exposed portion of the air-chamber, bodies of rubber located between the inner and outer layers of fabric inwardly from the edges of the metallic protective strip, and an inner air-tube of rubber, all united by vulcanization, substantially as described.

In testimony whereof I affix my signature in presence of two witnesses.

IRVIN TENNANT.

Witnesses:
F. M. HAGAN,
IRVINE MILLER.